(12) United States Patent
Luinge et al.

(10) Patent No.: US 10,059,080 B2
(45) Date of Patent: Aug. 28, 2018

(54) METHOD FOR THE PRODUCTION OF A FIBER COMPOSITE COMPONENT, AND SEMIFINISHED TEXTILE PRODUCT THEREFOR

(75) Inventors: Hans Luinge, Munich (DE); Georg Wachinger, Rosenheim (DE)

(73) Assignee: AIRBUS SAS, Blagnac (FR)

( * ) Notice: Subject to any disclaimer, the term of this patent is extended or adjusted under 35 U.S.C. 154(b) by 2127 days.

(21) Appl. No.: 13/059,662

(22) PCT Filed: Aug. 18, 2009

(86) PCT No.: PCT/DE2009/001171
§ 371 (c)(1),
(2), (4) Date: Feb. 18, 2011

(87) PCT Pub. No.: WO2010/020237
PCT Pub. Date: Feb. 25, 2010

(65) Prior Publication Data
US 2011/0143619 A1    Jun. 16, 2011

(30) Foreign Application Priority Data
Aug. 18, 2008 (DE) .................. 10 2008 038 294

(51) Int. Cl.
*B32B 5/26* (2006.01)
*B29B 11/16* (2006.01)
(Continued)

(52) U.S. Cl.
CPC ............ *B32B 5/26* (2013.01); *B29B 11/16* (2013.01); *B29C 70/025* (2013.01); *B29C 70/443* (2013.01); *B32B 9/00* (2013.01); *B32B 27/12* (2013.01); *B32B 27/20* (2013.01); *B32B 27/281* (2013.01); *B32B 27/285* (2013.01); *B32B 27/286* (2013.01); *B32B 27/302* (2013.01); *B32B 27/304* (2013.01); *B32B 27/308* (2013.01); *B32B 27/32* (2013.01);
(Continued)

(58) Field of Classification Search
USPC ............................................. 442/59
See application file for complete search history.

(56) References Cited

U.S. PATENT DOCUMENTS

| 4,868,050 A | 9/1989 | Tanaka et al. |
| 6,843,953 B2 | 1/2005 | Filsinger et al. |
| 7,179,517 B2 | 2/2007 | Jones et al. |

FOREIGN PATENT DOCUMENTS

| DE | 100 13 409 C1 | 11/2000 |
| DE | 102004011019 A1 | 12/2004 |

(Continued)

OTHER PUBLICATIONS

International Search Report from PCT/DE2009/001171, dated Jun. 7, 2010.

*Primary Examiner* — Matthew D Matzek
(74) *Attorney, Agent, or Firm* — Leydig, Voit & Mayer, Ltd.

(57) ABSTRACT

A method for manufacturing a fiber composite component includes providing a semi-finished textile product; injecting a matrix material into the semi-finished textile product so as to form an infiltrated semi-finished product, wherein the matrix material includes a thermoplastic film having particles dispersed therein; and curing the infiltrated semi-finished product.

5 Claims, 2 Drawing Sheets

(51) Int. Cl.
  *B29C 70/02* (2006.01)
  *B29C 70/44* (2006.01)
  *B32B 9/00* (2006.01)
  *B32B 27/12* (2006.01)
  *B32B 27/20* (2006.01)
  *B32B 27/38* (2006.01)
  *C08J 5/24* (2006.01)
  *B32B 27/28* (2006.01)
  *B32B 27/30* (2006.01)
  *B32B 27/32* (2006.01)
  *B32B 27/34* (2006.01)
  *B32B 27/36* (2006.01)
  *B29K 105/18* (2006.01)
  *B32B 38/08* (2006.01)

(52) U.S. Cl.
  CPC ............. *B32B 27/34* (2013.01); *B32B 27/36* (2013.01); *B32B 27/38* (2013.01); *C08J 5/24* (2013.01); *B29K 2105/18* (2013.01); *B32B 38/08* (2013.01); *B32B 2260/021* (2013.01); *B32B 2260/046* (2013.01); *B32B 2264/102* (2013.01); *B32B 2307/3065* (2013.01); *B32B 2307/514* (2013.01); *B32B 2307/558* (2013.01); *B32B 2605/08* (2013.01); *B32B 2605/18* (2013.01); *Y10T 442/20* (2015.04)

(56) References Cited

FOREIGN PATENT DOCUMENTS

| | | |
|---|---|---|
| DE | 102004023900 A1 | 12/2005 |
| DE | 102004047344 A1 | 1/2006 |
| DE | 601 05 831 T2 | 3/2006 |
| DE | 102005003713 A1 | 7/2006 |
| EP | 1 502 727 A1 | 2/2005 |
| EP | 1770115 A1 * | 4/2007 |
| EP | 1770155 A1 * | 4/2007 |
| WO | WO 2008/076244 A1 | 6/2008 |
| WO | WO 2009/014788 A2 | 1/2009 |

* cited by examiner

METHOD FOR THE PRODUCTION OF A FIBER COMPOSITE COMPONENT, AND SEMIFINISHED TEXTILE PRODUCT THEREFOR

CROSS REFERENCE TO PRIOR APPLICATIONS

This application is a U.S. National Phase application under 35 U.S.C. § 371 of International Application No. PCT/DE2009/001171, filed on Aug. 18, 2009 and claims benefit to German Application No. DE 10 2008 038 294.9, filed on Aug. 18, 2008. The International Application was published in German on Feb. 25, 2010 as WO 2010/020237 under PCT Article 21 (2).

FIELD

The invention relates to a method for the manufacture of a fibre composite component, comprising an injection of a matrix material into a semi-finished textile product (e.g. containing a woven, meshed, or layered structure, etc.) and a subsequent curing of the infiltrated semi-finished product. The invention furthermore relates to a semi-finished product suitable for this purpose, and/or its manufacture. The invention finally relates to an application of a manufacturing method of this type, and/or a semi-finished product of this type.

BACKGROUND

Fibre composite components are of interest in many areas of application, primarily on account of their high specific strength (ratio of strength to weight). A fibre composite material is a hybrid material, which in general consists of two main components, namely a matrix, and fibres that are embedded therein. The matrix usually takes the form of a thermally hardenable synthetic resin, with particular additives ("resin system") as required.

For many areas of application of fibre composite components properties, or property improvements would be desirable which often cannot be achieved with the current matrix materials, or only to an unsatisfactory extent.

SUMMARY OF THE INVENTION

An aspect of the present invention is to identify a path to the improvement of particular properties of fibre composite components, so as to be able in this manner to open up e.g. new areas of application.

In an embodiment, a semi-finished textile product to be cured contains at least one semi-finished product layer, which is constructed from a film of a thermoplastic with particles dispersed therein, in particular micro-particles or nano-particles.

Here the term "micro-particle" is intended to indicate, in particular, particles with an average particle size (e.g. diameter) of less than 100 µm. If at least one dimension of the particles is less than 100 nm, one normally talks of "nano-particles".

In a preferred form of embodiment the distribution of particles has an average particle size of less than 1 µm, in particular less than 500 nm. The average mutual separation between the particles can, for instance, be of the same order of magnitude, or even smaller.

It has transpired that, depending on the type and arrangement of the particles, which preferably take the form of inorganic particles; a considerable improvement of the performance characteristics of the finished fibre composite component can be achieved (e.g. improved fire or flame resistance, increased thermo-oxidative stability, impact protection, media resistance, etc.).

In one preferred form of embodiment the particles are formed from a layered silicate.

In layered silicates, also denoted as phyllosilicates, $SiO_4$-tetrahedra, which form the basic unit of all silicates, are cross-linked with one another in layers. Within the framework of the invention any layered silicates can in principle be used, such as e.g. bentonite (preferred, in particular with quarternary amides), halloysite, hectorite, illite, kaolinite, montmorillonite, palygorskite, etc.

Furthermore it is preferred if the nano-dispersed particles possess a platelet-shaped form, and if in the film these platelets possess a preferred alignment parallel to the plane of the film. Here, in particular, particles come into consideration whose average lateral extent is at least 10 times, in particular, 20 times, their thickness. The thickness of the platelet-shaped particles can lie e.g. in a range from about 5 to 100 nm.

With regard to the preparation of platelet-shaped particles the layered silicates already referred to above are of interest, because their individual layers are able to flare out (intercalate), or separate from one another completely (exfoliate). For exfoliation, as also for the dispersion of particles from layered silicates, suitable methods are e.g. described in DE 10 2004 011 019 A1 and DE 10 2004 023 900 A1 and can advantageously be deployed within the framework of the present invention. In particular the layered silicate can already be suitably modified before its introduction into the thermoplastic; for example, it can be organophilically adjusted by means of cation exchange. Further options known per se are e.g. a hydrophobation (e.g., by means of an onium compound), a coupling with organosilanes, or other surface treatments. Good results have been achieved e.g. with organically modified, nano-dispersed layered silicates, such as are commercially available e.g. under the trade name "Nanofil" (e.g. "Nanofil EXM 1485").

The layered silicate can, already at least partially intercalated and/or partially exfoliated, be added accordingly to a monomer or prepolymer used for the manufacture of the thermoplastic film. In one form of embodiment provision is e.g. made that the intercalation and exfoliation takes place in an extruder, to which, alongside a thermoplastic material, the layered silicate is introduced as an additive, for example in a quantity of about 5 to 10% by weight.

Since inorganic material, such as, in particular, the layered silicates preferred in the invention can disperse (and align itself) usually only to an unsatisfactory extent in those resin systems that are usually used in the manufacture of fibre composite components (in particular thermosetting plastics such as e.g. epoxy resin) the integration, provided in accordance with the invention, of a thermoplastic film in a semi-finished textile product advantageously creates, as it were, a "vehicle for the introduction of improved property nano-particles into any matrix material". A particularly advantageous and therefore preferred embodiment of the manufacturing method in accordance with the invention envisages that the thermoplastic (in other words the "vehicle") is displaced from the particles (at least partially replaced by the matrix material), or dissolves, during the injection of the resin material, or at the latest during the curing of the infiltrated semi-finished product. In particular in the manufacture of fibre composite components in the aerospace technology sector certain thermal conditioning sequences are often provided during infiltration and curing. A thermal conditioning profile of this type for an epoxy resin system can e.g. start at about 120° C. (during infiltration) and end at about 180° C. (during a curing phase). The thermoplastic and the temperature profile are preferably selected such that the film does not dissolve right at the start of the infiltration process, but preferably weakens at most. In this manner any "flowing away" of the thermoplastic film, as a result of the resin flowing into the semi-finished product can be avoided. Any dissolution of the thermoplastic preferably begins to a considerable extent at the end of the infiltration process at the earliest. The dissolution can e.g. take place during a so-called dwell phase after the infiltration, but before the full curing process.

For the manufacture of the thermoplastic film recourse can be made to methods known per se. In particular the film can be manufactured by means of an extrusion process, wherein a thermoplastic material supplied to the extruder in question can preferably already be displaced by the particle material (e.g. an exfoliated layered silicate). In the film the particle material can form a component of e.g. 1 to 10% by weight (e.g. about 7% by weight).

In one form of embodiment provision is made that during its manufacture the film is stretched in at least one direction before the cross-linking of the thermoplastic. In this manner, for example, platelet-shaped nano-particles, such as e.g. layered silicate platelets can be orientated into a preferred alignment parallel to the plane of the film. Alternatively or additionally the orientation of the platelet-shaped particles can also already take place "automatically" during the extrusion process within the framework of the film manufacture (by the "flowing" of the film material).

The film used for the method in accordance with the invention can e.g. possess a thickness of less than 100 μm. Good results have been achieved with e.g. films of a thickness of about 80 μm. It is, however, to be noted that the film thickness can strongly vary with regard to an "optimal thickness", depending upon the particular application. If e.g. the component of thermoplastic in the epoxy resin is to be kept low, then the film should be selected to be as thin as possible. On the other hand, a particularly thin selection of film thickness for a prescribed film material and prescribed thermal conditioning in the fibre composite manufacturing process could cause too rapid or premature a dissolution of the film, so that in practice the optimum film thickness often ensues as a compromise. The point in time and/or the speed of dissolution of the thermoplastic also depends, needless to say, on the particular thermoplastic material used.

In one form of embodiment provision is made that the thermoplastic is a polymer from the group consisting of polyimide (PI), polyetherimide (PEI), polyether sulphone (PES), phenoxythermoplastic, polyamide (PA), polyethylenterephthalate (PET), polyethylene (PE), polyester, polyetherester, polyesteramide, polymethylmethacrylate (PMMA), polypropylene (PP), polystyrene (PS), polyvinylchloride (PVC), or mixtures of these. In this regard, as also concerning any additives, which are added to such a polymer or polymer mixture, recourse can be made to methods known per se. In one form of embodiment e.g. the addition of a phenoxy thermoplastic (e.g. 1 to 10% by weight of the total weight) is provided. Alternatively, the thermoplastic consists essentially of a phenoxy thermoplastic (with further additives as required).

In one preferred form of embodiment the thermoplastic takes the form of a thermoplastic that is soluble in the resin system that is used during later manufacture of the fibre composite component (in order to infiltrate the semi-finished product). PI, PEI, PES and phenoxy thermoplastics fall into this category, for example.

The film, populated with dispersed, e.g. nano-dispersed particles, can be utilised for the formation of one or a plurality of semi-finished product layers of the semi-finished product in question, for which e.g. a stacking of individual fibrous material layers, and at least one film layer, can be provided for the construction of the semi-finished product. In this manner e.g. layers of exfoliated layered silicates with a preferential orientation (parallel to the semi-finished product layers) can be positioned very accurately in the manner desired. The fibrous material layers can e.g. contain carbon fibres, glass fibres, synthetic plastic fibres, or other fibres used in fibre composite technology.

The fibrous material layers stacked together during construction with one or a plurality of films can already be impregnated (pre-impregnated) with the matrix material in question. In this case a so-called "pre-preg" is created, with the particular feature, however, that this contains at least one semi-finished product layer, which is constructed from a thermoplastic film with particles nano-dispersed therein. As is usual for pre-pregs, after the arrangement of the individual layers the matrix material can already be partially cross-linked, so as to guarantee the cohesion of the individual layers relative to one another. The manufacture of the fibre composite component takes place in this case by means of a "pre-preg process", in which the semi-finished textile product pre-impregnated with the matrix material is further moulded as necessary and finally cured (e.g. thermally).

In another form of embodiment provision is made that in the construction of the semi-finished textile product dry fibrous material layers with at least one film of the type described above are stacked together and the matrix material in question is injected only later. In one particularly preferred form of embodiment of this variant the injection of the matrix material takes place with vacuum assistance. Methods of this type for the infiltration of semi-finished textile products are widely known from the prior art. In this regard reference can be made, just as examples, to suitable methods such as VARI or VAP. In methods of this type the semi-finished textile product is laid down onto a mould surface of a tool, while the other side of the tool is formed by a gas-tight film. By the generation of a vacuum in the region of the semi-finished product the resin system used as a matrix material can, to a certain extent, be sucked into the textile structure (cf. e.g. DE 100 13 409 C1).

The injection of the matrix material can be carried out in a thermally conditioned manner such that the thermoplastic hereby weakens and dissolves in the resin during the infiltration process, or preferably at the start of the curing process. It should not be ruled out that the thermoplastic may at least partially even be thermally decomposed. In particular for the case in which the parameters of the infiltration process are selected such that the thermoplastic film does not melt during infiltration, a perforated film can be used to improve the infiltration flow of the matrix material.

Independently of the manner of infiltration of the semi-finished product with the matrix material (e.g. vacuum process or pre-preg process) provision is made in accordance with one particularly preferred form of embodiment that curing is carried out in a thermally conditioned manner such that the thermoplastic film hereby dissolves, at least for the most part. Depending on the type of thermoplastic used and the matrix material used for the infiltration (and the thermal conditioning of the process) a dissolution of the thermoplastic can on occasion already have taken place to a considerable extent at the start of the curing process. This is advantageously possible in the thermal conditioning processes that are widely used in fibre composite technology. For epoxy resin systems, e.g., the following thermal conditioning process can be provided, although this is just to be understood as an example: heat up the preform at about 2° C./min to about 100 to 120° C., first dwell stage for one hour (infiltration), heating at about 2° C./min to about 180° C., second dwell stage for about two hours.

The matrix material preferably takes the form of a synthetic resin that can be cross-linked to a thermosetting plastic. In accordance with one form of embodiment the matrix material is an epoxy resin system.

Matrix materials of this type, which are very advantageous for the manufacture of fibre composite materials, allow only a very limited dispersion of layered silicates and practically no alignment at all of exfoliated layered silicate particles. This is particularly true for single component systems on an epoxy resin basis such as are e.g. predominantly deployed in the manufacture of fibre composite components in aviation. Moreover, an introduction of layered silicates into resin systems of this type would lead to significant increases in viscosity that would hamper their processing in the fibre composite manufacturing process, or make it impossible.

The problems described above, of integrating inorganic nano-particles, in particular exfoliated layered silicates, in a well-defined manner (finely dispersed and aligned as necessary) into the matrix of a fibre composite component, are solved in an elegant manner in accordance with the invention. Thus e.g. layered silicates can be dispersed in a thermoplastic and if necessary aligned, and extruded into a film; these are then stacked together with fibrous material layers (containing unidirectional or multidirectional reinforcement fibres), and further processed, for example, in a VAP or a pre-preg process. After infiltration, or at the latest during the curing process (for an epoxy resin system e.g. at more than 180° C.) the thermoplastic base material of the film dissolves; however, the particles can hereby remain dispersed and aligned. The invention thus makes possible, in particular, the dispersion and alignment of layered silicates in epoxy resins. In the resulting fibre composite component the layered silicates can be accurately positioned (by means of an appropriate stacking sequence in the semi-finished product layers structure, and appropriate film construction). The resin system used for infiltration of the semi-finished product does not need to be modified before processing. In particular no problems arise regarding the low viscosity of the resin system that is necessary for infiltration processes of this type.

An application of the manufacturing method in accordance with the invention is the manufacture of a structural component in aerospace or vehicle technology. An improvement achieved with the invention of flammability properties (e.g. as a result of the barrier effect of dispersed layered silicates) can be applied e.g. to the generation of new materials in the production of aircraft and helicopters (e.g. shell-like fuselage components with improved flammability (protection) properties and/or increased impact resistance).

BRIEF DESCRIPTION OF THE DRAWINGS

In what follows the invention is further described with the aid of an example of embodiment with reference to the accompanying drawings. In the figures, each in schematic form.

DETAILED DESCRIPTION

Figure 2:
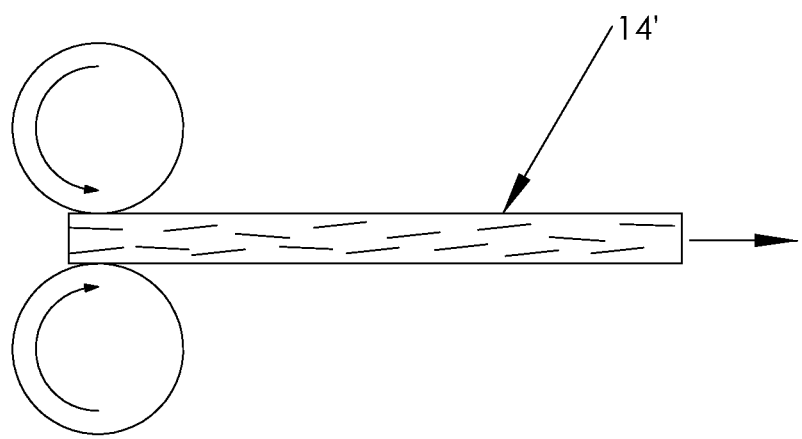
FIG. 2 shows the manufacture of a film with layered silicate particles of a thermoplastic from FIG. 1 aligned therein.
Figure 3:
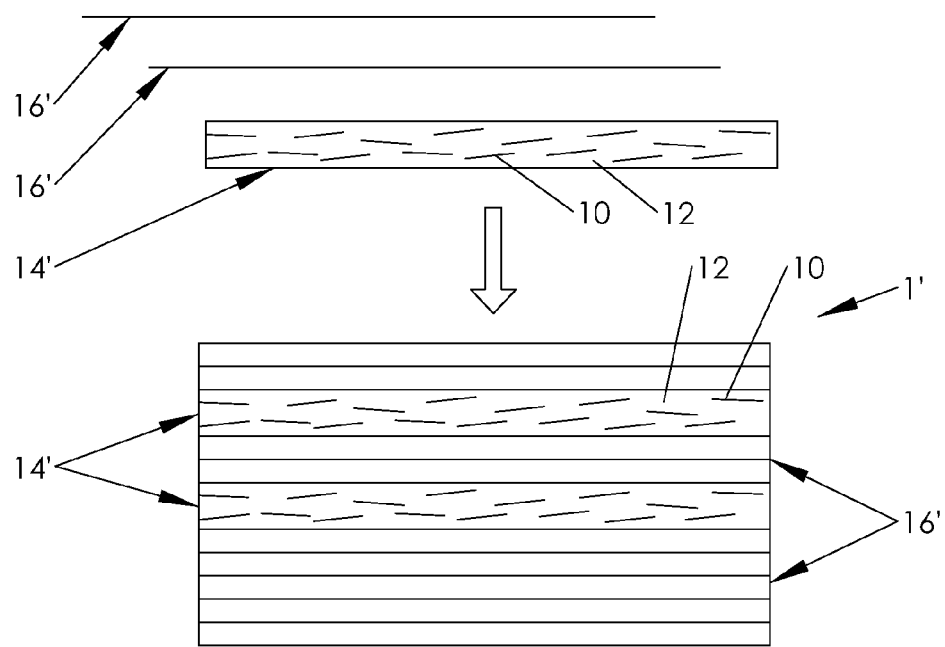
FIG. 3 shows the manufacture of a semi-finished textile product from sections cut from the film from FIG. 2, and further semi-finished product layers of fibrous material.
Figure 4:
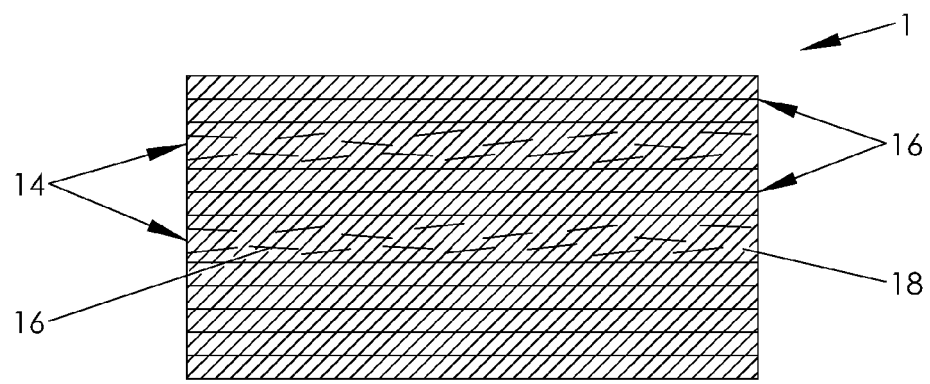
FIG. 4 shows a fibre composite component, manufactured by infiltration of the layered structure of FIG. 3 with an epoxy resin, and subsequent curing.

FIGS. 1 to 4 illustrate the principal steps in the process for the manufacture of a fibre composite component 1 (FIG. 4).

Figure 1:
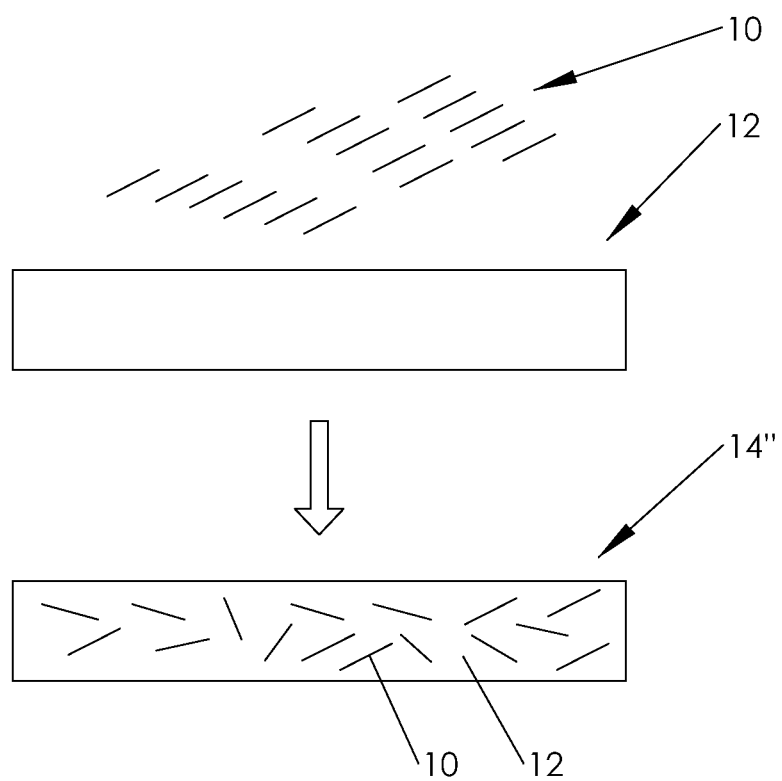
FIG. 1 shows the dispersion of layered silicate in a thermoplastic.

FIG. 1 illustrates the introduction of a layered silicate 10 into a thermoplastic material 12, in what follows also denoted as a "thermoplastic", which is formed e.g. from a phenoxy polymer. This introduction can take place e.g. by means of an extruder, to which a thermoplastic granulate is supplied, together with the layered silicate, so as to generate a thermoplastic mass 14", in which particles of the layered silicate 10 are distributed in the thermoplastic 12. In one form of embodiment the introduction of the layered silicate takes place with the addition of one or a plurality of additives to cause or promote an at least partial exfoliation of the layered silicate 10.

Subsequently (or in the same extrusion process) the material 14" is further processed into a thin film 14'. In this step, promoted by stretching the film 14' in one or two directions, as is illustrated in FIG. 2, an alignment of the platelet-shaped layered silicate particles 10 takes place such that these are preferably orientated parallel to the plane of the film.

FIG. 3 illustrates the construction that then takes place of a semi-finished textile product 1' by the stacking of semi-finished product layers; these are formed partially from fibrous material layers 16' (e.g. carbon fibres) and partially from planar sections cut from the film 14'. In the example represented the fibrous material layers 16' take the form of a "dry fibrous material" (e.g. unidirectional fibres, multi-axial fibrous layers, a weave, a fibrous mat, etc.). In contrast to this, it is possible as an alternative to use fibrous material already pre-impregnated with a matrix material of the later fibre composite component for the construction of the semi-finished textile product V.

The semi-finished textile product 1' represented in FIG. 3 possesses in any case the particular feature that it contains at least one semi-finished product layer, which is constructed from the film 14' of the thermoplastic 12 with nano-particles (here: exfoliated layered silicate 10) dispersed therein. The one or a plurality of films 14' in this semi-finished product 1' are arranged in accordance with the desired distribution of the nano-particles in the finished fibre composite component.

In accordance with a further development provision is made that the semi-finished product contains a plurality of films of the type described; these differ from one another, however, with regard to the thermoplastic base material and/or the type and/or arrangement relative to one another (e.g. concentration, separation, orientation, etc.) of the particles 10. In other words the semi-finished product need not necessarily contain films (cut sections) from the one and the same film manufacture batch. In this manner can e.g. semi-finished products or fibre composite components be generated, whose properties vary over the thickness. A fire protection layer is in general sensible, e.g. near or on the surface of the fibre composite component in question.

The semi-finished product 1' is then in a further step further processed in a manner known per se, that is to say, it is infiltrated with the desired matrix material (here: an epoxy resin system) and subsequently cured. For this purpose all methods of known art from fibre composite technology (e.g. MARI etc.) come into consideration in principle. In the variant already described above with pre-impregnated fibrous material layers 16' further processing takes place by means of a so-called pre-preg process, for example in a moulding and curing tool.

FIG. 4 illustrates the finished fibre composite component 1 as a result of injection and curing of an epoxy resin 18. It consists of the cured epoxy resin matrix 18, with fibres of the fibrous material layers 16 embedded therein, and nano-dispersed and aligned layered silicate particles 10 embedded therein.

The thermoplastic material 12 still surrounding the particles 10 in the semi-finished product layers 14' In the semi-finished product 1' (FIG. 3), is for practical purposes no longer present in this form in the finished component 1. It has dissolved at the latest during the thermal curing process (e.g. at more than 120° C., e.g. at about 180° C.). In the finished component 1 the particles 10 are therefore, for the most part, surrounded by the fully cross-linked epoxy resin 18.

In summary, the invention enables in particular the introduction of dispersed and orientated layered silicates into the epoxy resin matrix of a fibre composite component. The soluble thermoplastic hereby used serves as a "vehicle" for the introduction of the layered silicate particles, and in practice has just a negligible influence on the resulting fibre composite matrix. Furthermore, a prefabricated semi-finished product for the method described lies within the framework of the invention.

The invention claimed is:

1. A semi-finished textile product for a fibre composite component comprising:
    a semi-finished textile product containing at least one semi-finished product layer including a thermoplastic film having particles dispersed therein,
    wherein the particles are platelet-shaped and are aligned relative to one another parallel to a plane of the film, and wherein the alignment of the particles takes place before and during the formation of the film.

2. The semi-finished textile product as recited in claim 1, wherein the particles are micro-particles.

3. The semi-finished textile product as recited in claim 2, wherein the particles are nano-particles.

4. The semi-finished product as recited in claim 1, wherein the particles are particles of a layered silicate.

5. The semi-finished product as recited in claim 1, the thermoplastic includes a polymer selected from the group consisting of polyimide, polyetherimide, polyether sulphone, phenoxythermoplastic, polyamide, polyethylenterephthalate, polyethylene, polyester, polyetherester, polyesteramide, polymethylmethacrylate, polypropylene, polystyrene and polyvinylchloride.

* * * * *